US007016748B2

(12) United States Patent
Hamlin

(10) Patent No.: US 7,016,748 B2
(45) Date of Patent: Mar. 21, 2006

(54) COLLABORATIVE INTEGRATION OF HYBRID ELECTRONIC AND MICRO AND SUB-MICRO LEVEL AGGREGATES

(75) Inventor: Christopher L. Hamlin, Los Gatos, CA (US)

(73) Assignee: LSI Logic Corporation, Milpitas, CA (US)

( * ) Notice: Subject to any disclaimer, the term of this patent is extended or adjusted under 35 U.S.C. 154(b) by 521 days.

(21) Appl. No.: 10/135,869

(22) Filed: Apr. 30, 2002

(65) Prior Publication Data

US 2003/0204369 A1 Oct. 30, 2003

(51) Int. Cl.
*G06F 19/00* (2006.01)

(52) U.S. Cl. ............................ 700/97; 700/98; 700/96; 700/121; 716/1; 716/2; 901/30; 901/46

(58) Field of Classification Search .................. 700/97, 700/98, 96, 121; 716/1, 2; 901/30–50
See application file for complete search history.

(56) References Cited

U.S. PATENT DOCUMENTS

| | | | | |
|---|---|---|---|---|
| 5,673,367 | A * | 9/1997 | Buckley | 706/23 |
| 5,752,070 | A | 5/1998 | Martin et al. | 395/800.33 |
| 5,898,677 | A | 4/1999 | Deeley et al. | 370/276 |
| 6,152,613 | A | 11/2000 | Martin et al. | 395/800.33 |
| 6,205,362 | B1 * | 3/2001 | Eidson | 700/4 |
| 6,269,277 | B1 | 7/2001 | Hershenson et al. | 700/97 |
| 6,569,382 | B1 * | 5/2003 | Edman et al. | 422/68.1 |

OTHER PUBLICATIONS

Clark, J. et al. "Active sensing at a microscopic scale" Sep. 1990, Proceeding of the 1990 5th IEEE international symposium, pp. 246-251 vol. 1.*
Pappas, I. et al. "Visual control of a microbot operating under a Microscope" Nov. 1996, Proceedings of the 1996 IEEE/RSJ international conference on, pp. 993-1000 vol. 2.*
Codourey, A. et al. "A robot system for automated handling in micro-world" Aug. 1995, Proceedings of the 1995 IEEE/RSJ international conference on, pp. 185-190 vol. 3.*
Codourey, A. et al. "Design of micro- and nano-robots" Sep., 1994, Proceedings, From Perception to Action Conference, pp. 340-343.*
"Self-Reconfigurable Programmable Logic Device" by Reetinder Sidhu, et al.; File # 3115; University of Southern California, Office of Technology Licensing, Los Angeles, CA; www.usc.edu/academe/otl; Sep. 7, 2001.

(Continued)

*Primary Examiner*—Wilbert L. Starks, Jr.
*Assistant Examiner*—Thomas Pham
(74) *Attorney, Agent, or Firm*—Suiter West Swantz PC LLC

(57) ABSTRACT

The present invention is directed to a system and method for providing a collaborative integration of hybrid electronic and micro and sub-micro, including nano, level aggregates. A method of sampling aggregate nano behavior to determine progress by the nano aggregate toward a desired result may include sampling at least one of aggregate nano and aggregate micro behavior by a transducer. The aggregate behavior is measured through use of the sample by a macro level control apparatus. If the measured aggregate behavior is identified as diverging from progress toward a desired result, an effector is activated by the macro level control apparatus to influence the aggregate behavior toward progress toward the desired result.

20 Claims, 3 Drawing Sheets

OTHER PUBLICATIONS

"Tensilica Navigates 'Sea of Processors' Designs" by Chris Edwards; *Electronics Times*; Jun. 14, 2001; www.eetimes.com., News Channels Semiconductors.

"On-Chip Networks Weighed as Wiring Alternative" by Ron Wilson, *Integrated System Design*, Jun. 25, 2001; www.eetimes.com., News Channels Design Automation.

"Configurable Computing" by John Villasenor et al., Scientific American, Jun. 1997; www.sciam.com/0697issue/0697villasenor.html; Apr. 19, 2002.

"Sea-of-IP: An Ocean of Design Possibilities", Royal Phillips Electronics; Philips Semiconductors—Technology Home Pages; Sea-of-IP; ©2001 Royal Phillips Electronics; 3 pages.

* cited by examiner

COLLABORATIVE INTEGRATION OF HYBRID ELECTRONIC AND MICRO AND SUB-MICRO LEVEL AGGREGATES

CROSS REFERENCE TO RELATED APPLICATIONS

The present application hereby incorporates the following U.S. patent applications by reference in their entirety:

| Attorney Docket Number | Ser. No. | Filing Date |
|---|---|---|
| LSI 01-390 | 10/015,194 | Nov. 20, 2001 |
| LSI 01-488 | 10/021,414 | Oct. 30, 2001 |
| LSI 01-489 | 10/021,619 | Oct. 30, 2001 |
| LSI 01-490 | 10/021,696 | Oct. 30, 2001 |
| LSI 01-524B | 10/044,781 | Jan. 10, 2002 |
| LSI 01-543 | 10/135,189 | Apr. 30, 2002 |
| LSI 01-695 | 09/842,335 | Apr. 25, 2001 |
| LSI 01-827 | 10/034,839 | Dec. 27, 2001 |
| LSI 01-828B | 10/061,660 | Feb. 1, 2002 |

FIELD OF THE INVENTION

The present invention generally relates to the field of computational structures, and particularly to a collaborative integration of hybrid electronic and micro and sub-micro level aggregates.

BACKGROUND OF THE INVENTION

Computational systems employing structures at new scale levels are on the verge of becoming feasible in laboratories, and will before long emerge in commercial form. Great ferment surrounds research efforts to resolve the immensely difficult problems attending the production of realistic practical computational solutions based on nanotechnology. A tremendous amount of work is being done on defining aggregate nano-level behaviors.

For instance, there are numerous activities surrounding quantum communications, in which communications are conveyed through photons or other quantum-level phenomena. For example, quantum computers have been defined, which have the attribute of being able to perform previously intractable computations like decryption. However, when large aggregates of nano- or micro-scale entities are deployed to solve a computational problem, the aggregates' individual behaviors are subject to random variation which cannot be governed in the same way gates and transistors are controlled deterministically in an integrated circuit.

Therefore, it would be desirable to provide a system and method for measuring and compensating for such stochastic variability, and may provide large scale oversight of the evolution of behaviors in the nano- or micro-scale aggregates on the part of a macro-level authority.

SUMMARY OF THE INVENTION

Accordingly, the present invention is directed to a system and method for providing a collaborative integration of hybrid electronic and micro and sub-micro, including nano, level aggregates. In an aspect of the present invention, a method of sampling aggregate behavior to determine progress by the aggregate toward a desired result includes sampling at least one of aggregate nano and aggregate micro behavior by a transducer. The aggregate behavior is measured through use of the sample by a macro level control apparatus. If the measured aggregate behavior is identified as diverging from progress toward a desired result, an effector is activated by the macro level control apparatus to influence the aggregate behavior toward progress toward the desired result.

In an additional aspect of the present invention, a system for sampling aggregate behavior to determine progress by the aggregate toward a desired result includes an aggregation of structures, a transducer, a macro level control apparatus and an effector. The aggregation of structures is sized as at least one of a nano and micro level. The transducer is suitable for sampling behavior of the aggregation of structures. The macro level control apparatus is coupled to the transducer and coupled via a bidirectional interface to the aggregation of structures; the macro level control apparatus suitable for providing formalisms for influencing aggregate behavior. The effector is coupled to the macro level control apparatus, the effector operable to influence the aggregate behavior upon activation by the macro level control apparatus.

In a further aspect of the present invention, a system for sampling aggregate behavior to determine progress by the aggregate toward a desired result includes an aggregation of structures, a means for sampling, a means for controlling and a means for effecting. The aggregation of structures is sized as at least one of a nano and micro level. The sampling means is suitable for sampling behavior of the aggregation of structures. The controlling means is coupled to the sampling means, the controlling means suitable for providing formalisms for influencing aggregate behavior. The effecting means is coupled to the controlling means, the effecting means operable to influence the aggregate behavior.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
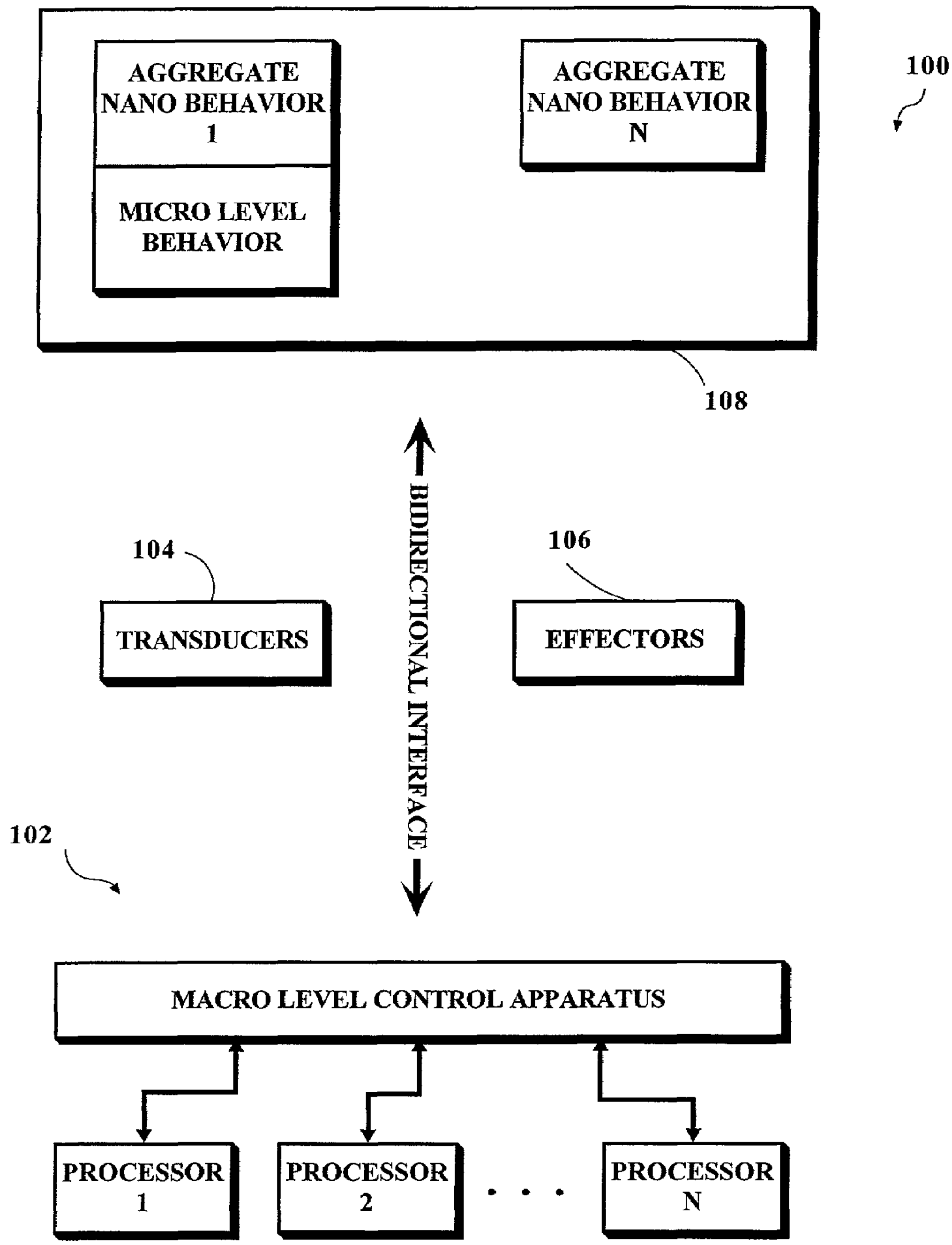
FIG. 1 is an illustration of an embodiment of the present invention wherein a system operable to embody the present invention is shown.
Figure 2:
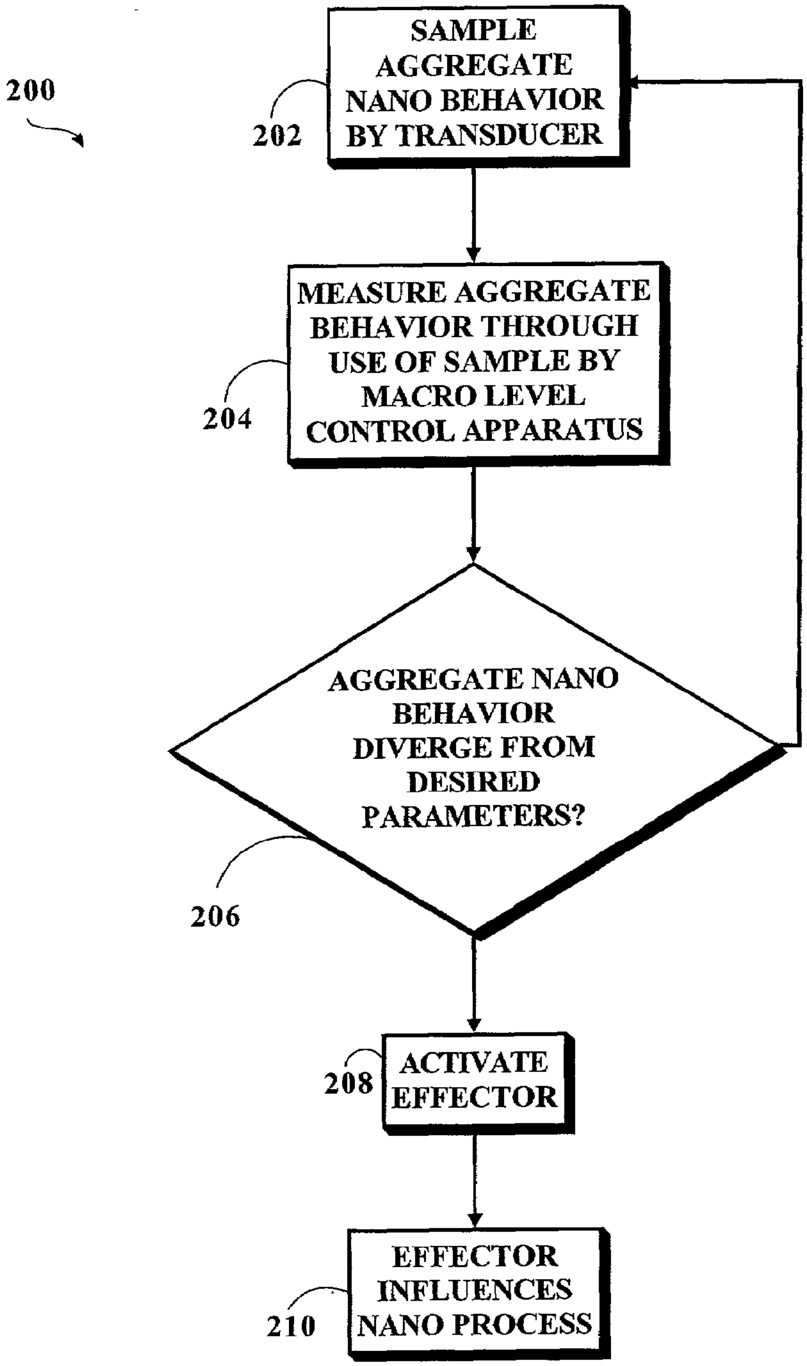
FIG. 2 is a flow diagram illustrating an exemplary method of the present invention wherein aggregate nano behaviors are sampled by transducers and utilized to influence effectors to restore normal operation of the aggregates.
Figure 3:
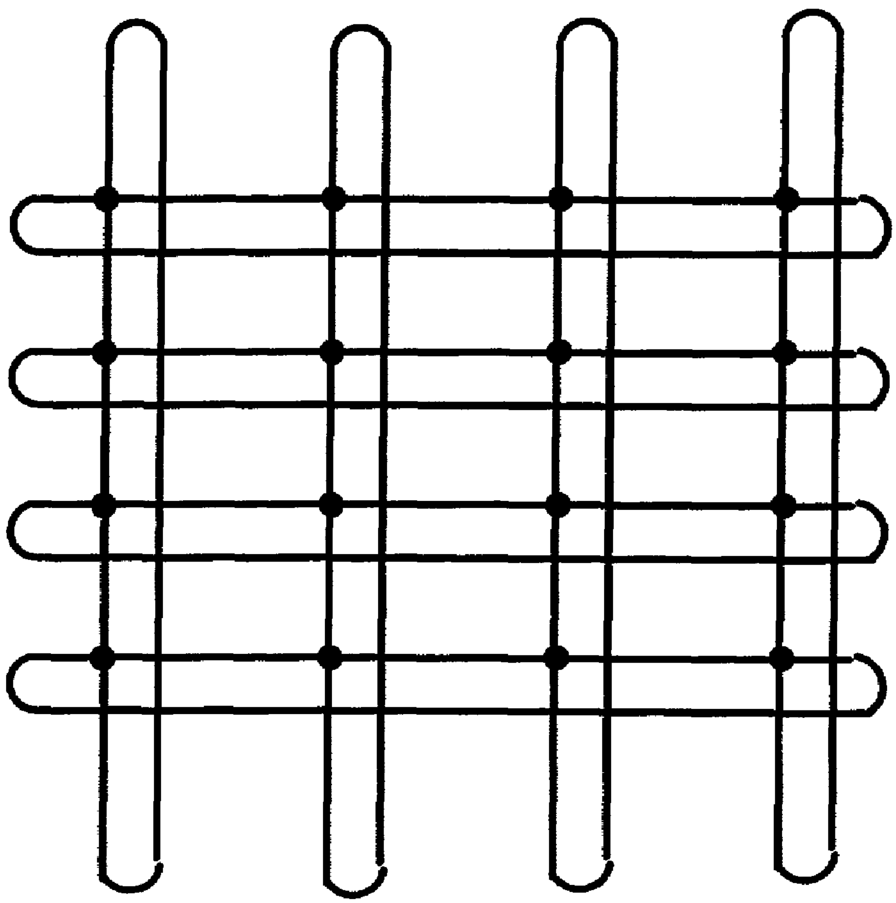
FIG. 3 is an illustration of an embodiment of the present invention wherein a symmetrical fabric structure is shown.

Referring generally now to FIGS. 1 through 3, exemplary embodiments of the present invention are shown. Computational systems employing structures at new scale levels is on the verge of becoming feasible in laboratories, and will before long emerge in commercial form. Great ferment surrounds research efforts to resolve the immensely difficult problems attending the production of realistic practical computational solutions based on nanotechnology. The present invention addresses an alternative approach to the resolution of two central problems in the development of practical nanocomputing: error control and process control.

In this discussion phenomena are broadly understood for convenience on three levels or scales. The nano-scale refers to phenomena and structures on the scale of sub-atomic through atomic entities. The micro-scale refers to molecular-scale entities. The macro-scale refers to entities at the level of contemporary conventional semiconductor fabrication (such as a 90 nanometer node). Notice that in this formulation micro electro-mechanical systems (MEMS), which are sometimes confused with nano-technology, is a macro-level phenomenon. MEMS constructs might be employed at the macro-level to augment many of the functions disclosed below.

A tremendous amount of work is being done on defining aggregate nano-level behaviors. "Aggregate" refers to phenomena that are expressed in large collections of atoms or subatomic particles. This is also true at the micro level. For example, work in this area includes protein memories and DNA structures for computation, because it has been recognized that DNA has the ability to express equivalents of Turing machines or other computational abstractions.

Thus, efforts have been underway for many years to define these kinds of aggregates. There are also a lot of activities surrounding quantum communications, in which communications are conveyed through photons or other quantum-level phenomena. For instance, quantum computers have been defined, which have the attribute of being able to perform previously intractable computations like decryption. These aggregate phenomena may be replicated in any number of structures. Eventually, fabrication technologies will be defined for realizing practical aggregates at this nano and micro level. The micro level being the molecular, for example, DNA structures.

When large aggregates of nano- or micro-scale entities are deployed to solve a computational problem, the aggregates' individual behaviors are subject to random variation which cannot be governed in the same way gates and transistors are controlled deterministically in an integrated circuit. Such stochastic variability must be measured and compensated for; and may require large scale oversight of the evolution of behaviors in the nano- or micro-scale aggregates on the part of a macro-level authority.

Therefore, the present invention provides a system and method to interact with aggregates in ways that allow what is happening at the nano level and at the aggregate level to be measured, sampled, investigated, and the like on the one hand, and to be controlled or modulated on the other hand. Such interaction is performed preferably regardless of what kind of aggregate it is and regardless of what class of operation or transformation or computation that the aggregate is being invoked to pursue.

The present invention addresses the properties and characteristics of such a meta-level authority. For instance, the control and oversight function is well suited to the capabilities of large, powerful von Neumann machines based upon conventional electronics, perhaps arranged in multi-dimensional multi-processing fabrics, which are relatively slow and large by comparison with nano- or micro-level entities but complement the properties of nano-level and micro-level machines by dint of the machine's determinism and the well understood properties of the algorithms and data processing procedures of which the machines are capable. In this way, macro-level determinism augments the power of nano- and micro-level processing power by rendering the error and control problems tractable.

In order to exploit nano- and micro-scale computing structures, the present invention describes a set of relationships between entities of four types: the nano- or micro-scale processing structure, the macro-scale control interface, the macro-scale control structure, and the macro-scale error- and servo-control facility interacting with each of the other entities.

Under the present invention, a distinction is made between statistical aggregate phenomena (the precise state of any one of whose constituents cannot in principle be set or determined), on the one hand, and deterministic phenomena, including processes and structures (whose precise state may be explicitly set and read), on the other. In the present invention these two classes of phenomena are treated in a complementary fashion. The attributes of the deterministic class of phenomena (typically manifested at the macro-level) and the attributes of the statistical class of phenomena (typically manifested at the nano- and micro-level) are integrated in such a way that complementary properties reinforce the effectiveness of the ensemble.

In particular, devices are proposed whose nano- and micro-scale structures and processes are integrated with macro-level structures and processes in a single logical or physical system, wherein the control function necessary for the correct interpretation of the aggregate phenomena at the nano- or micro-level is implemented at the macro-level scale and tightly integrated both logically and physically with the aggregate structures for whose interpretation it is responsible.

As one example, interface and control functions at the nano- and micro-level might include measuring light, capturing images, titrating reagents, modulating and/or measuring fields and currents, detecting reaction byproducts, sampling forces, and the like. Under various architectures, such control functions may be incorporated in feedback loops whose purpose is to govern and interpret the progress of aggregate electronic, chemical, quantum, and mechanical processes at the nano- and micro-levels.

In this way, the present invention contemplates the tight integration of these subject nano- and micro-level phenomena with algorithms, and the means necessary to execute and interpret the results of the algorithms at the macro-level, needed to control the evolution of the aggregate processes such that the processes may be interpreted and the resultant outcome or outcomes correctly detected and recorded.

In a practical embodiment, this invention may be manifested either as two components: (1) harboring a nano- or micro-scale set of structures and processes; and (2) a separate macro-scale set of interfaces, detectors, algorithms, and control structures logically integrated with the nano- and micro-scale phenomena being controlled, interpreted, and corrected. Additionally, the invention may be manifested in a preferred refinement as a single physical package similar to a semiconductor device, wherein the nano- or micro-scale structures and processes are tightly integrated with the macro-scale algorithmic and control apparatus. For many purposes, this may be the economically preferable arrangement, since high volume manufacturing could be applied to the production of such hybrid integrated systems devices.

At least two classes of phenomena are addressed in the present embodiment of the invention. First, there are transducers of various kinds, which are capable of, in some sense, of measuring, sampling, and detecting operations at the nano and micro levels. Secondly, effectors may be provided which have the effect of altering the progress of processes that are taking place at the micro and nano levels. A bi-directional interface may be provided between the micro and nano level on the one hand, and the macro level, such as a large-scale semiconductor level, on the other hand.

Referring now to FIG. 1, an embodiment 100 of the present invention is shown wherein a general model for a structure, in which transducers and effectors operating at the macro level with respect to aggregates exhibiting behaviors of interest at the nano and micro level, is illustrated. The model of the present embodiment includes four structural elements. The first structural element in this model is a control function at the macro level 102.

The second is a set of one or more transducers 104 which are capable of detecting the progress of processes taking place at the micro and nano levels. It should be noted that the transducers may be configured as a hybrid device, such as a hybrid device where an actual micro-level, molecular-level phenomenon has been fabricated and synthesized, as well as including a nano-level component. This may be beneficial in instances involving interactions between the micro level and the nano level that are fruitful for combining, may include nano-level phenomena that would be sampled and measured, and the like as contemplated by a person of ordinary skill in the art.

The third element is the effector 106, which is operable to govern, alter and influence the course, the progress, of this aggregate-level phenomenon taking place at the nano or micro level. The fourth element includes one or more actual aggregate collections 108 as described previously.

In this aspect of the present invention, at the macro control level there are sets of processors of a fairly conventional kind. For instance, one or more processors may be provided in some sort of a collection whose purpose is to implement a control algorithm. The control algorithm, as implemented by the processors, may sample the transducers, accept input from the transducers, and then processing and interpreting it at the macro level. The result is sent to one or more effectors whose characteristic is to alter, preferably in an optimal manner, the progress of whatever process of interest or concern is occurring at the micro or nano level.

The practical implementation of nanotechnology and micro-technology may depend on close integration of the high-level control functions and the effectors and transducers associated with them with these aggregates. In other words, the essence of deriving the functionality from nano- and micro-technology, which previously has tended to focus exclusively on the particles and possibly aggregate behaviors of this level, in practical realization may depend largely or entirely on how this interface is effected between macro-level processing capability, and the ability to interpret and govern the progress of phenomena, such as aggregate phenomena, at the micro and nano level; and also the control algorithms and structures used to implement such.

Within such devices, all four of the entities described earlier may be fabricated: the nano- or micro-level aggregate structures and processes, the sampling and detection apparatus, the control structures, and the algorithmic and processing facilities necessary to the interpretation and modification of the processes and phenomena occurring at the nano- or micro-level within the device.

As a particular example, consider the problem of error correction in aggregate nano and micro-scale phenomena. Previously, error correction was thought of as a wholly deterministic step, in which a code provides one and only one map identifying the codeword which has been transmitted but whose correct reception had been corrupted to some extent by noise.

Suppose a coherent electro-chemical process has been initiated in a population of several billion molecules, whose general outcome is a function of the evolution of a reaction within the aggregate, and suppose further that the aggregate state of the molecules may be sampled through electrophoresis or other means.

The evolution of the process may deviate from the optimum outcome in each of several different dimensions (perhaps characterized parametrically by electrical, chemical, photonic, or other indicators) and it may be necessary to apply corrective stimuli to the aggregate simultaneously through several different mechanisms (electronic, chemical, photonic, thermal, mechanical, and the like). In so doing, algorithms operating simultaneously in each of the relevant dimensions may be implemented in the tightly integrated set of processors, perhaps arranged in a higher dimensional configuration conforming isomorphically to the structure of the nano- or micro-level phenomenon of interest.

Such formalisms are well known in the field of coding theory, and the implementation of such a formalism in a multi-dimensional structure would be readily understood by a coding theorist in conjunction with the present invention. These algorithms could then furnish the necessary feedback to guide the correct evolution of the underlying process according to the more nearly ideal requirements of the nano- or micro-scale mechanism(s).

Thus, the present invention prescribes a macro-level computational facility tightly integrated with a control interface, capable of communicating with measurement and control apparatus at the nano- and micro-scale, interacting in turn with varieties of nano- and micro-scale aggregate phenomena whose progress and outcomes represent novel approaches to efficient computation and problem solving.

Referring now to FIG. 2, an exemplary method of the present invention is shown wherein aggregate nano behaviors are sampled by transducers and utilized to influence effectors to restore normal operation of the aggregates. Aggregate nano behavior is sampled by a transducer 202. The aggregate behavior is measured through use of the sample by a macro level control apparatus 204. If the aggregate nano behavior is consistent within the operational parameters expected of the aggregate 206, i.e. is progressing toward the desired solution and/or functionality, the sampling continues 202.

However, if the aggregate nano behavior diverges from desired parameters 206, an effector is activated by the macro level control apparatus 208 and utilized to influence the nano process 210. In this way, transducers and effectors may be utilized by a macro level control apparatus to influence and correct aggregate nano behavior.

Organization of the relationships between macro-level sampling, measurement and control functions on the one hand and how they interact with the micro- and nano-level phenomena on the other is of particular interest. It is contemplated by the present invention that a single device may be provided that unifies macro-, micro-, and nano-level phenomena on a single device that are interacting according to these principles.

One of the most important aspects of a system of the present invention is error control. Communications and computational processes that are operating at this level have a radically different error characteristic than the ones that user are conventionally accustomed to thinking about at the macro level in ordinary computer equipment. The macro level, the error control, the error detection and error control process is fundamental to the success of modem computation and communications. It is predicated on a completely deterministic model. In other words, it says that in principle it is possible to guarantee the correct operation of the aggregate of transistors that are being utilized or the aggregate of recording media in a disk drive or the like, or the behavior of a wave front, such as a communications wave front, such that errors can be detected with certainty, and further, that errors occurring can be corrected.

However, when confronted with aggregates of billions of particles, billions of atoms, billions or many, many, millions of molecules or more, and exploiting the aggregate properties, it is contemplated that in some aspects the same heuristic may not be applicable. For instance, that every single protein folds in exactly the same correct way, because anomalies may be encountered. There may be nano- or micro-scale mutations that are encountered, and further, the mutations may not be able to be detected individually.

Therefore, the function for error control should be adaptive. A variety of adaptive processes are contemplated by the present invention. For instance, formal abstract theoretical models may be proposed, such as to detect the progress of a computation at a nano or micro level; and in the process of detecting it, identifying that the aggregate is tending in a direction which is deviant from convergence on an answer, or on a correct path. To do this, an effector may be utilized in conjunction with the transducer control system so that the effector is activated by the control apparatus to cause the process to go in different directions. Thus, the structures are important from an interrelationship point of view with respect to the control/transducer/effector arrangement, because the structures have a type of closed-loop interaction.

An effector may influence the aggregate process utilizing a variety of methods without departing from the spirit and scope of the present invention. For instance, at the nano level, lasers may be utilized, interferometry, holography, and the like may be important. At the micro level, titration may be performed for finely modulating a process. At both levels there may be a variety of structures and methods employed for sampling fields; for using micro structures and nano structures; for sampling fields associated with the aggregate phenomena, including three-dimensional fields that are evolving within the microstructure itself; and the like.

The structures for employing these method and processes may be synthesized utilizing a variety of methods. For example, a use that is being made today for the macro level to have an effect on the DNA level, the molecular level, is using inkjet printers, and specifically, modifying inkjet heads to generate extraordinarily tiny droplets for concentration. Therefore, a DNA set may be mixed with adenine, guanine, cytosine, and thymine on a medium using titration with inkjets. Work on chaotic dynamics of droplet formation and movement allows extremely tight control to be exerted over droplet formation and trajectories. A variety of other methods are contemplated by the present invention without departing from the spirit and scope thereof to enable sampling and measurement, may be subjected to algorithms, and may be governed and controlled through an effector mechanism.

Therefore, droplet formation may be utilized at an extraordinarily small scale and with high degrees of control in the device itself, such as that obtained by laser systems and holographic systems in the device itself. Another option is electrophoresis for sampling the progress of an aggregate's behavior in a device. At this level, transducers may drive image processing and pattern recognition algorithms that will give important insight into the correct progress of an operation of a computational or communications algorithm at the micro and nano level.

One of the main uses of MEMS includes fabricating effectors that are in tight control loops and that are acting as intermediaries for governing the behavior of the nano- and micro-scale aggregate phenomena. There are a variety of MEMS structures contemplated by the present invention, such as mirrors, actual physical electromechanical structures, wave front modulators, and the like. MEMS fabrication is going to be tightly integrated with the fabrication of structures of the nano and micro level, but all subject to this macro-level control.

The present invention provides tight integration of this collection of behaviors to form a complex system. Thus, the present invention provides an optimal structure at the top level for interpreting and operating on what is happening at the lower level, whether it is titration using MEMS, utilization of a piezoelectric structure, how to close the loop through sampling efforts with image processing, pattern recognition, or whether it is through interferometry, holography or other technologies such as electrophoretic sampling, and the like. Other control structures are also contemplated by the present invention. For instance, the aggregate-level phenomena may enforce emergence of a variety of control structures.

The computational demands at the macro level may be extreme, such as for accomplishing sampling and control loops. However, such computational resources may be provided by sub-micron and beyond processors that occupy less than a square millimeter. Therefore, the computational demands, while extreme, may be provided in extremely small areas.

This is a complete conceptual transformation, because the computational requirements of the macro level, while such resources requirements may be great, may be relegated to a relatively minor bit-role in the operation of vastly more powerful computational and process-level phenomena, such as protein folding. Thus, the present invention allows the implementation of a system having a massive reallocation of responsibilities over previous systems. Where today this macro-level control and computation structure would be the whole wheel, such a structure may be utilized to track aggregates of the present invention having even greater resource and functional abilities.

Other sampling and transducer mechanisms are contemplated, such as photonic detection mechanisms and material signs associated with photonics. For instance, the physical integration of photonics with the macro-level control mechanisms. For example, today variants of photoelectric effect devices are used in fairly primitive forms, as well as cavity resonance and lasers. The question of the photonic, electronic boundary and how it is measured and controlled is going to require sophisticated control structures of this kind, just in the service of understanding what is happening at the nano and micro level of operation and control.

There is a wide variety of information available concerning micro level computation, both at the quantum level and at the molecular level. In quantum communications, the codes for correcting errors in quantum channels are different mathematically than the codes used in today's electronic and photonic communications. Because of the difference in the codes, more complex processing at this level will be needed.

Aspects of the present invention address the question of how to use transducers and effectors in control structures to operate optimally on behavior that is taking place at the aggregate level. The present invention provides a general, systemic structure that is going to be necessary for the formation of a large class of devices and processes.

Switching fabrics and platforms may also be utilized in conjunction with the present invention. For example, the actual structure of switching fabric of multiple dimensions may be used for processors and other semiconductor operations and intellectual property on the chip may not be symmetrical. In other words, that it will be the case from a purely abstract point of view that the optimal arrangement of processors and electronic operations in a switching fabric would be asymmetrical in that it did not have mirror reflection in whatever dimension. There is some empirical evidence suggesting asymmetric structures, although most switching fabrics, just for practical reasons, tend to be symmetrical in structure, may be discovered to have optimal characteristics.

A genetic algorithm approach to discovering those asymmetries is going to be important. So in an interesting kind of way, genetic programming and evolutionary computation at the level of specifying optimal meshes or fabric structures at the macro level may play a very key role in allowing the optimal governance of the nano- and micro-level processes.

For example, suppose a simple switch fabric is provided with a processor at every node in a cross-bar structure, as shown in FIG. 3. The ends of the lengths are joined as they often are in practice. By providing a cross-bar structure of this kind, what is actually provided is a two-dimensional portal. For instance, the portal may be thought of as a donut in which communication is performed around the circumference, or through the "hole" of the donut. This is a perfectly symmetrical structure because if it was sliced and broken into halves, each half is identical, although it is a mirror opposite, and this may be generalized to multiple dimensions.

However, in designing networks and switching fabrics, symmetrical designs are not always optimal. Very often, optimal structures are not symmetrical, such as by having some parts that are not universally connected, having holes, including portions where the paths are not universally connected, including portions where some pieces of the network/fabric are actually isolated from one another, the structure is incomplete and unbalanced, and the like.

Such structures may lend themselves toward directing traffic flow. For example, "hot spots" may be encountered, where a richer collection of nodes are provided so that there is less congestion and greater availability of resources; areas where all of the traffic tends to be highly structured and there is very little switching activity, so that what is really desired is larger traffic "conduits" capable of sending large amounts of traffic, but where the switching behavior is moderate; and the like.

When designing a switching fabric, the degrees of freedom available when approaching an asymmetrical structure that is not balanced, but is targeted at being optimal in context of a particular kind of traffic service, of a service model, or of a traffic model are so great that it may not be NP-complete, i.e. it is an intractable problem to compute an optimal solution or no polynomial kind of solution is thought to be in principle for this class of problems. However, through the use of genetic algorithms in accordance with the present invention, such a problem may be approached.

For instance, genetic algorithms may be used for designing optimal gate array structures, both the individual cell designs and the structure of the gate array itself, in the array of the components in the gate array. This is counter-intuitive in a way, because previously symmetrical systems were thought to have greater degrees of freedom. Nature is a combination of symmetrical and asymmetrical structures in a complex relationship to one another. Some pieces of nature are highly symmetrical and orderly, and some pieces are highly asymmetrical or turbulent.

But there is a lot of empirical work that may be done here as understandable by a person of ordinary skill in the art without undue experimentation, for instance approximation may be understood, empirical exploration may be done with well known genetic algorithms, and the like.

One way of thinking about it is to suppose that the nano- or micro-level phenomenon is extremely specialized. It is clear that, for example, the quantum level computation is capable of taking one problem and only one problem and taking it apart and putting it back together again. But it has very little general capability. So in a sense, the present invention takes micro- and nano-level components and arranges it as a highly specialized system, which previously would be difficult to govern and interpret. The system may include specialized aggregate components and uses general but well understood macro-level control principles to operate on and to allow the micro- and nano-level component to do specialized operation optimally and to exert classical control functions, like error correction and detection, image-processing, titration, field detection and management, interferometry, and the like.

The whole array of well understood material science and physical principles may be deployed at that nano and micro level to get control over these processes and of the "lower" level components to be integrated with and exported to a highly efficient, carefully conceived macro level of processing and control. Thus, the present invention provides the characteristics of practical devices in which these extraordinarily powerful but specialized nano- and micro-level processors will be allowed to go forward.

It is believed that the apparatus, system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of sampling aggregate behavior to determine progress by the aggregate toward a desired result, comprising:

sampling at least one of aggregate nano and aggregate micro behavior by a transducer; and measuring the aggregate behavior through use of the sample by a macro level control apparatus;

if the measured aggregate behavior is identified as diverging from progress toward a desired result, an effector is activated by the macro level control apparatus to influence the aggregate behavior toward progress toward the desired result.

2. The method as described in claim 1, wherein the macro level control apparatus implements control functions for interpretation of the aggregate behavior.

3. The method as described in claim 2, wherein the control functions are implemented through use of a control algorithm.

4. The method as described in claim 2, wherein the macro level control apparatus includes semiconductor processors.

5. The method as described in claim 1, wherein measuring includes at least one of measuring light, capturing images, titrating reagents, modulating fields, modulating currents, measuring fields, measuring currents, detecting reaction byproducts and sampling forces.

6. The method as described in claim 1, wherein a bidirectional interface is provided between the at least one of nano and micro behavior and the macro level control apparatus through use of the transducer and effector.

7. The method as described in claim 1, wherein the effector is operable to at least one of govern, alter and influence a course of aggregate level behavior.

8. The method as described in claim 1, wherein the effector operates to alter aggregate level behavior by at least one of electronic, chemical, photonic, thermal and mechanical processes.

9. A system for sampling aggregate behavior to determine progress by the aggregate toward a desired result, comprising:

an aggregation of structures, the structures of the aggregation sized as at least one of a nano and micro level;

a transducer suitable for sampling behavior of the aggregation of structures;

a macro level control apparatus coupled to the transducer; the macro level control apparatus suitable for providing formalisms for influencing aggregate behavior; and an effector coupled to the macro level control apparatus, the effector operable to influence the aggregate behavior upon activation by the macro level control apparatus.

10. The system as described in claim 9, wherein the macro level control apparatus implements control functions for interpretation of the aggregate behavior.

11. The system as described in claim 10, wherein the control functions are implemented through use of a control algorithm.

12. The system as described in claim 10, wherein the macro level control apparatus includes semiconductor processors.

13. The system as described in claim 9, wherein the transducer measures the aggregation of structures through at least one of measuring light, capturing images, titrating reagents, modulating fields, modulating currents, measuring fields, measuring currents, detecting reaction byproducts and sampling forces.

14. The system as described in claim 9, wherein the effector operates to influence aggregate level behavior by at least one of electronic, chemical, photonic, thermal and mechanical processes.

15. A system for sampling aggregate behavior to determine progress by the aggregate toward a desired result, comprising:

an aggregation of structures, the structures of the aggregation sized as at least one of a nano and micro level;

a means for sampling behavior of the aggregation of structures;

a means for controlling, the controlling means operable at a macro level, wherein the controlling means is coupled to the sampling means; the controlling means providing formalisms for influencing aggregate behavior; and a means for effecting coupled to the macro level control apparatus, the effecting means operable to influence the aggregate behavior.

16. The system as described in claim 15, wherein the controlling means implements control functions for interpretation of the aggregate behavior.

17. The system as described in claim 16, wherein the control functions are implemented through use of a control algorithm.

18. The system as described in claim 16, wherein the controlling means includes semiconductor processors.

19. The system as described in claim 15, wherein the sampling means measures the aggregation of structures through at least one of measuring light, capturing images, titrating reagents, modulating fields, modulating currents, measuring fields, measuring currents, detecting reaction byproducts and sampling forces.

20. The system as described in claim 15, wherein the effecting means operates to influence aggregate level behavior by at least one of electronic, chemical, photonic, thermal and mechanical processes.

* * * * *